Oct. 9, 1934.  W. J. F. BIGGANE  1,975,919
CULINARY DEVICE
Filed Dec. 15, 1933    3 Sheets-Sheet 1
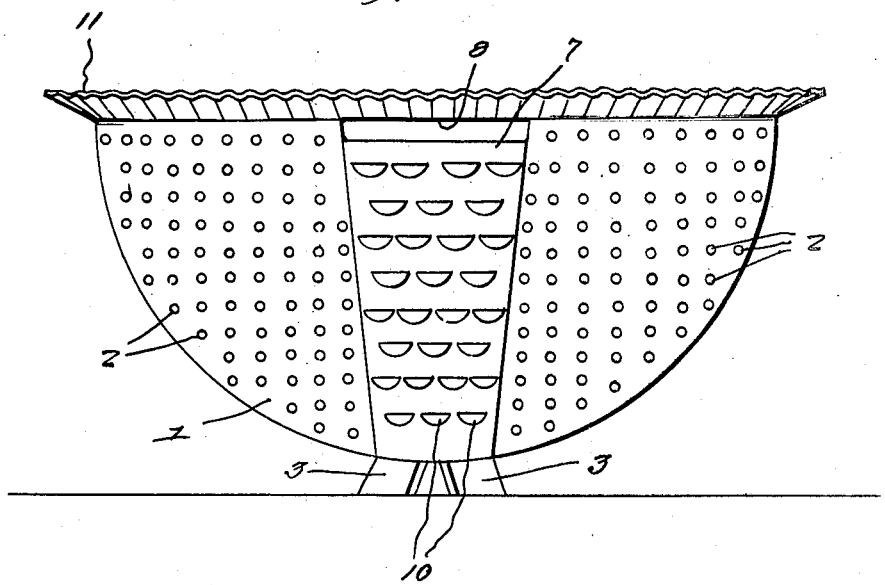
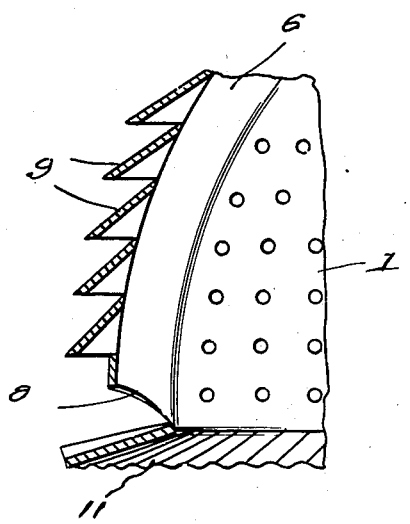
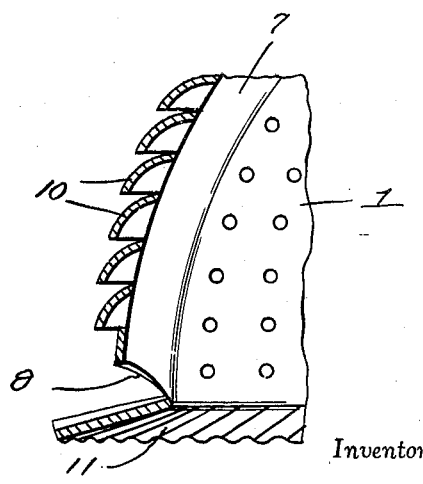
Inventor
W. J. F. Biggane
By Clarence A. O'Brien
Attorney Oct. 9, 1934.  W. J. F. BIGGANE  1,975,919
CULINARY DEVICE
Filed Dec. 15, 1933   3 Sheets-Sheet 2

Inventor
W. J. F. Biggane
By Clarence A. O'Brien
Attorney

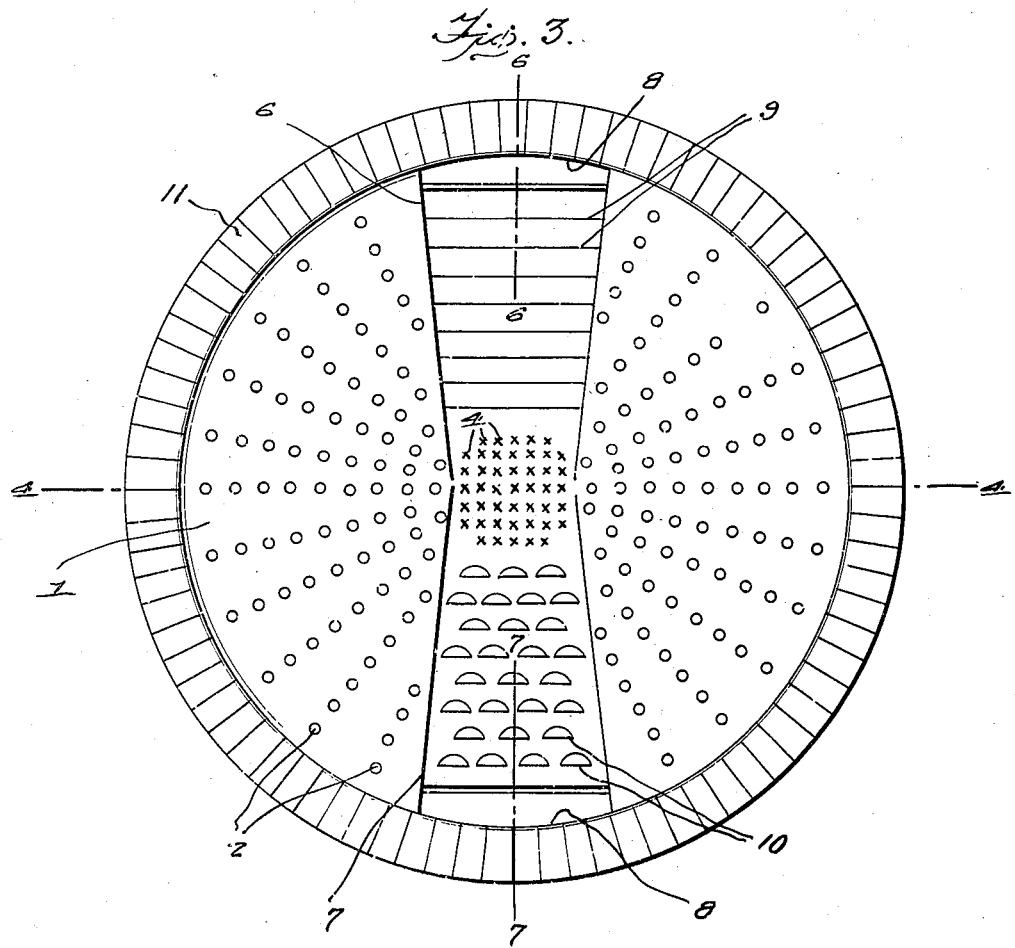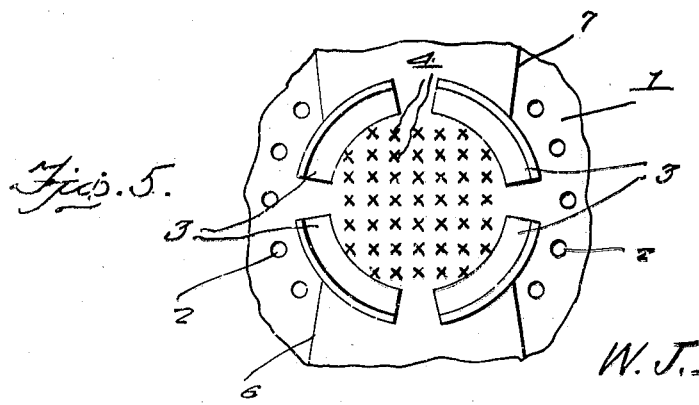

Patented Oct. 9, 1934

1,975,919

UNITED STATES PATENT OFFICE 1,975,919

CULINARY DEVICE

Walter J. F. Biggane, Ossining, N. Y.

Application December 15, 1933, Serial No. 702,583

2 Claims. (Cl. 146—180)

The present invention relates to new and useful improvements in culinary devices and has for its primary object to provide, in a single implement, a colander, a pie crust cutter and perforator, a greater and a slicer.

Other objects of the invention are to provide a culinary device of the aforementioned character which will be comparatively simple in construction, strong, durable, efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a culinary device in accordance with the present invention.

Figure 3 is a bottom plan view of the device.

Figure 5 is a bottom plan view of the central portion of the device.

Figure 6 is a fragmentary view in vertical section, taken substantially on the line 6—6 of Figure 3.

Figure 7 is a fragmentary view in vertical section taken substantially on the line 7—7 of Figure 3.

Figure 2:
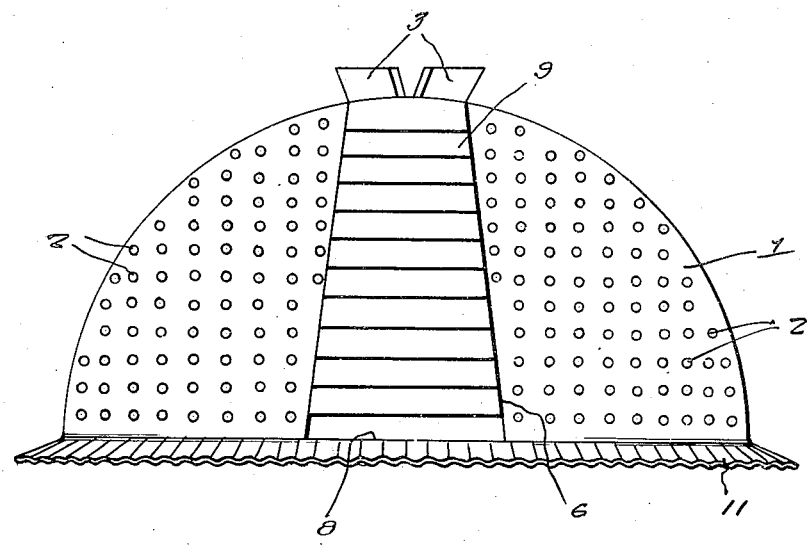
Figure 2 is a side elevational view, showing the device in position for use as a pie crust cutter.
Figure 4:
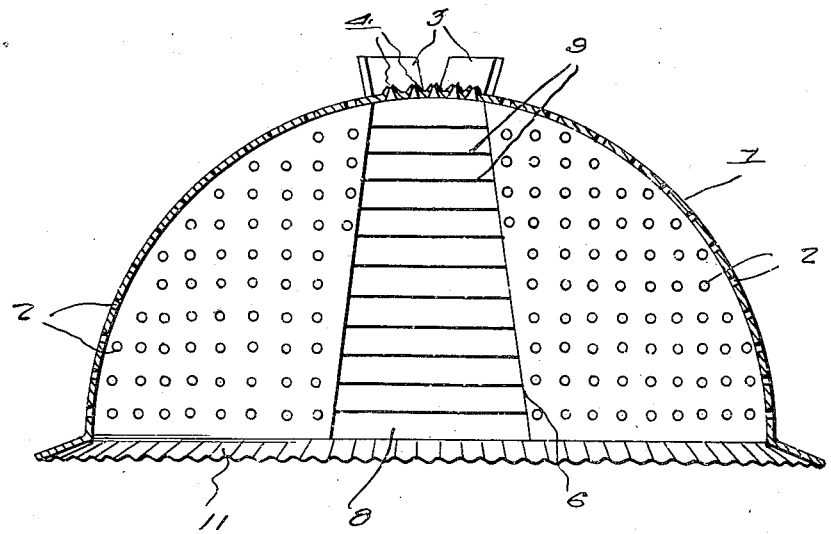
Figure 4 is a view in vertical section through the culinary device, taken substantially on the line 4—4 of Figure 3.

Referring now to the drawings in detail, it will be seen that the embodiment of the invention which has been illustrated comprises a substantially semi-spherical pan 1 of suitable metal having perforations 2 therein. The pan 1 is adapted to be supported in slightly elevated position through the medium of a circular series of spaced, substantially segmental legs 3 which are rigidly mounted on the lower portion of said pan. Within the area defined by the legs 3 the central portion of the pan 1 is punched or struck outwardly in a manner to provide a plurality of grating prongs 4. This is illustrated to advantage in Figures 4 and 5 of the drawings.

The pan 1 is further provided with internal depressions 6 and 7 which extend in opposite directions from the legs 3. The upper end portions of the depressions 6 and 7 of the pan 1 have formed therein openings 8 providing hand holds. Struck outwardly from the depressed portion 6 of the pan 1 are comparatively long slicing blades 9. Comparatively short slicing blades 10 are struck outwardly from the depressed portion 7 of the pan 1. At its top, the pan 1 terminates in an inclined, corrugated flange 11 constituting a pie crust cutter or trimmer and crimper.

Briefly, the device may be used as follows:—

When it is desired to trim and crimp a pie crust, the device is inverted and pressed downwardly over the pie in a manner to cause the member 11, in conjunction with the periphery of the pie pan, to sever the excess crust while at the same time crimping said crust. The device is of a size to function in conjunction with pie pans of average diameter but if the pan happens to be unusually large or small the crust may be successfully trimmed and crimped by turning the pan 1 right side up and rolling the same around the pie with the flange 11 engaged thereon. Then, the legs 3 may be utilized to punch steam escape openings in the pie crust.

When the grating surface of the pan within the area defined by the substantially segmental legs is to be used, said pan is inverted and it may rest on the flange 11 as a supporting base. It will thus be seen that the grated food-stuffs will be confined to a small or restricted area. For slicing, the pan is turned right side up and the material to be sliced is moved downwardly over the blades 9 or 10. The construction and arrangement of the blades 9 and 10 is such that the slices pass into said pan and are retained thereby. The slices are then ready to be washed and drained without handling. If the pan 1, while being held in the hands, is moved in a circular path in a substantially horizontal plane, the material therein is caused to whirl and eddy by the depressions 6 and 7 for thoroughly stirring said material, thereby accelerating the drainage.

It is believed that the many advantages of a culinary device constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A culinary device of the character described comprising a substantially semi-spherical perforated pan, a substantially outwardly directed flange on the peripheral edge of the pan, said pan including outwardly projecting diametrically opposite side portions extending from the lower central portion thereof to the flange and providing depressions in the pan, the outwardly projecting side portions of the pan having elongated openings therein providing hand holds, and integral slicing blades struck outwardly from said projecting side portions.

2. A culinary device of the class described comprising a substantially semi-spherical perforated pan, a circular series of spaced, substantially segmental legs mounted externally on the crown portion of the pan and grating prongs projecting from said pan within the area defined by the substantially segmental legs.

WALTER J. F. BIGGANE.